United States Patent [19]
Stirzel et al.

[11] Patent Number: 5,651,334
[45] Date of Patent: Jul. 29, 1997

[54] STEAM GENERATOR LATERAL SUPPORT

[75] Inventors: Christopher W. Stirzel, Irwin; Thou-Han Liu, Murrysville, both of Pa.

[73] Assignee: Westinghouse Electric Corporation, Pittsburgh, Pa.

[21] Appl. No.: 399,806

[22] Filed: Mar. 7, 1995

[51] Int. Cl.⁶ .................................................. F22B 37/20
[52] U.S. Cl. ........................................... 122/510; 376/285
[58] Field of Search ............................ 165/81, 82, 67, 165/162; 122/510; 376/285; 248/146

[56] References Cited

U.S. PATENT DOCUMENTS

| | | | |
|---|---|---|---|
| 3,771,499 | 11/1973 | Marroni, Jr. et al. | 122/510 |
| 4,583,584 | 4/1986 | Wepfer | 165/82 |
| 4,688,628 | 8/1987 | Moldenhauer | 165/67 |
| 4,940,025 | 7/1990 | Ott et al. | 122/510 |

OTHER PUBLICATIONS

"Plant–Wide Application Snubber Reduction At a Boiling Water Reactor", C. S. Haynes and T. E. Bostrom, American Society of Mechanical Engineers, Pressure Vessel and Piping Division, V. 127, pp. 119–124, Jun./Jul. 1987.

*Primary Examiner*—Henry A. Bennett
*Assistant Examiner*—Gregory A. Wilson

[57] ABSTRACT

A steam generator originally having hydraulic snubbers damping lateral thermal movement of the steam generator is backfit to laterally support the steam generator without hydraulic damping. Hydraulic fluid is emptied from piston cylinders of all snubbers extending from a steam generator; and then stops are placed around piston rods extending into the piston cylinders of empty snubbers extending from the back side of the steam generator to stop the thermal growth of the steam generator in the operation of the nuclear reactor vessel to generate power. Thus, the costs associated with maintaining, inspecting and testing hydraulic snubbers are entirely eliminated. Also, the backside empty snubbers are used as bumpers and do not incur disposal costs.

2 Claims, 1 Drawing Sheet

STEAM GENERATOR LATERAL SUPPORT

BACKGROUND OF THE INVENTION

The invention relates to a method of laterally supporting a steam generator in a nuclear power plant and, more particularly, to a method of supporting a steam generator originally supported with hydraulic snubbers.

A steam generator operatively connected with a pressurized water nuclear reactor by hot leg and cold leg piping must be able to withstand very large thermal forces as the system operates between room temperatures of about 70° F. during outages and temperatures of up to about 500° F. or more during power operation. Hydraulic snubbers are employed to laterally support a steam generator and to resist the loading forces. These snubbers allow very slow extension and retraction as the system thermally grows and contracts. Generally speaking, plants are designed such that the reactor vessels are fixed and the steam generators are allowed to float up to about one and a half inch or more. Hydraulic snubbers are essentially large bore piston assemblies connected with hydraulic fluid reservoirs. These snubbers have both sides of the piston communicating with the hydraulic fluid reservoirs to damp lateral movement of the snubber piston and, therefore, the steam generator. U.S. Pat. Nos. 4,940,025; 4,688,628; 4,583,584 and 3,771,499 are incorporated by this reference for their descriptions of the structures of steam generators and hydraulic and mechanical snubbers.

Since the early 1980s, the nuclear power industry has attempted to reduce the number of steam generator snubbers because they tend to be very expensive to maintain, inspect and test. The industry's heretofore unattained goal has been to entirely eliminate the use of hydraulic snubbers. However, the industry has been only able to reduce the number of snubbers required to support the steam generators. In addition, the snubbers are very large and radioactive and cannot be easily removed nor can they be simply left in the containments around the steam generators because available containment space is so limited.

SUMMARY OF THE INVENTION

It is an object of the present invention to entirely eliminate the need for hydraulically operated snubbers for steam generators in nuclear power plants originally designed to employ hydraulic snubbers. Thus, all of the maintenance, testing and inspection of steam generator snubbers and the cost associated with these hydraulic devices is eliminated. It is a further object to continue to employ at least some of the snubbers without hydraulic fluid to eliminate costs associated with their disposal.

With these objects in view, the present invention resides in a method of laterally supporting a steam generator originally having hydraulic snubbers damping lateral thermal movement of the steam generator by the steps of: emptying hydraulic fluid from all hydraulic snubbers originally supporting a steam generator; and then laterally supporting the steam generator with at least some of the empty snubbers as the steam generator moves in the operation of a nuclear reactor vessel connected to the steam generator by a hot leg. In the practice of the present invention stops are placed around piston rods extending into the piston cylinders of empty snubbers extending from the back side of the steam generator to stop the thermal growth of the steam generator in the high temperature operation of the nuclear reactor vessel to generate power. Advantageously, the empty snubbers on the back side are employed as bumpers.

BRIEF DESCRIPTION OF THE DRAWINGS

The invention as set forth in the claims will become more apparent from the following detailed description of a preferred practice thereof shown, by way of example only, in the accompanying drawings, wherein:

DESCRIPTION OF THE PREFERRED PRACTICE

Figure 1:
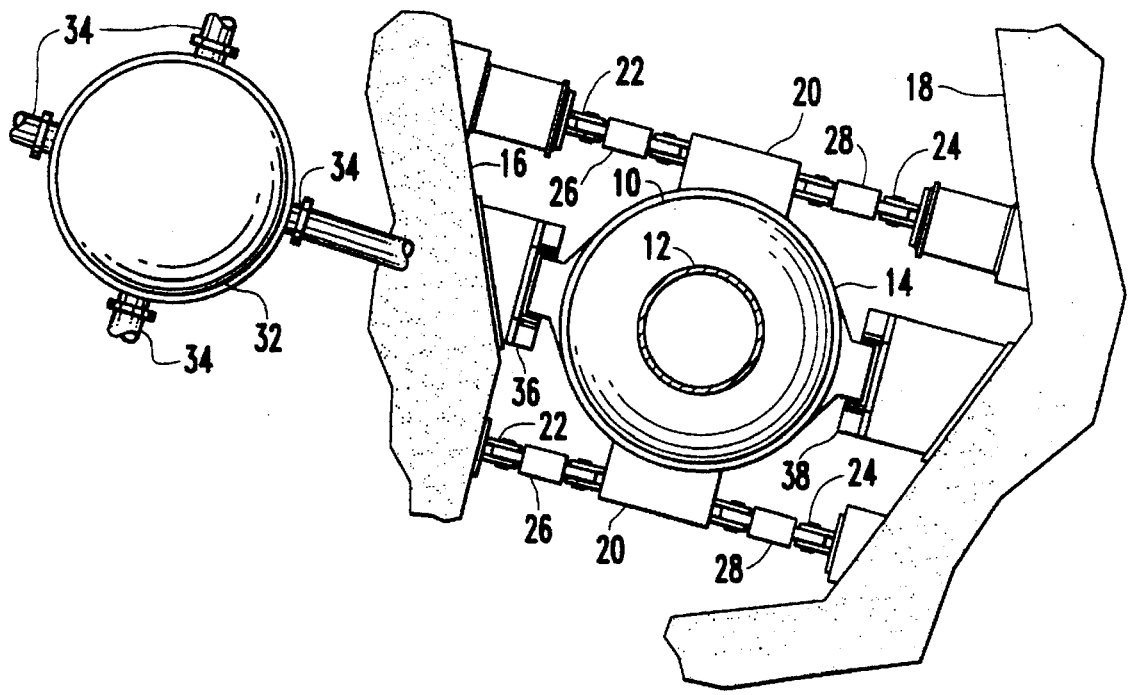
FIG. 1 is a plan view of a steam generator laterally supported by four snubbers which may be backfit in the practice of the present invention.

Referring now to the drawings in detail and in particular to FIG. 1, there is shown a conventional steam generator 10 having a steam outlet 12. The steam generator 10 is surrounded by a ring band 14 in a cavity defined by walls 16 and 18 in a containment vessel (not shown). The ring band 14 has extensions 20 which are mechanically connected with cavity wall front side supports 22 and backside supports 24 via two front side hydraulic snubbers 26 and two backside hydraulic snubbers 28. In commercial pressurized water nuclear reactor power plants, up to four (and illustrated for convenience as one) steam generators 10 are connected to one centrally located nuclear reactor vessel 32 by hot legs 34.

The reactor vessel 32 is normally designed to remain fixed in place and the steam generator 10 is designed to move up to about one and one half inches in a direction parallel to the hot leg 34 as shown as the system cycles from about 70° F. up to about 500° F. or more. The steam generator 10 laterally moves away from the first cavity wall 16 in a cold condition toward the second cavity wall 18 at high temperature operating conditions. Accordingly, a cold bumper stop 36 and a hot bumper stop 38 are employed to limit the maximum lateral movement of the steam generator 10.

Figure 2:
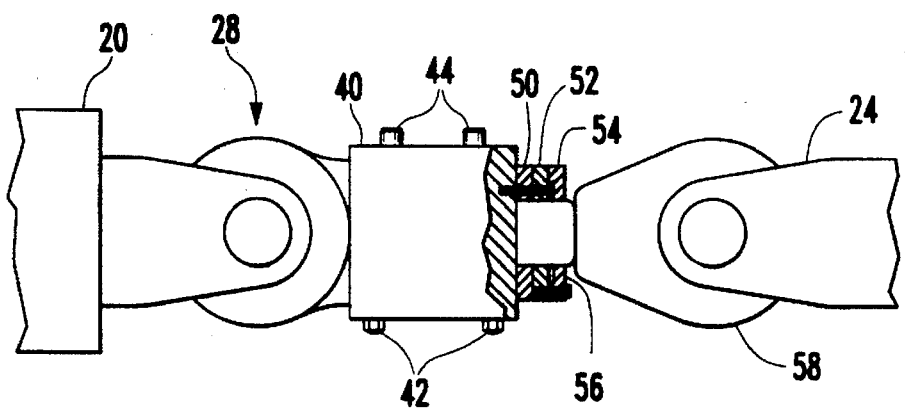
FIG. 2 is a partially sectioned view of a snubber of FIG. 1 modified for use in the practice of the present invention.

Heretofore, it has proven to be very costly to maintain, test and inspect the hydraulic snubbers 26 and 28. In particular, testing requires that each snubber be removed and the snubber piston stroked on a test facility. In the practice of the present invention, the use of hydraulics in this critical service and the problems associated therewith is entirely eliminated. FIG. 2 shows a backside snubber assembly 28 which has been backfit in the practice of the present invention. The hydraulic fluid in snubber cylinders are drained via drain plugs 42 and ports 44 are disconnected from oil lines extending from a hydraulic fluid reservoir in order to entirely empty the cylinders 40 of the snubbers 26 and 28. Preferably, the frontside snubbers 26 are permitted to remain in place without requiring the disposal of a radioactive device or, alternatively, the snubbers 26 may be removed.

In the practice of the present invention, the emptied backside snubbers 28 are modified and then utilized without hydraulic fluid as bumpers to limit the high temperature movement of the steam generator 10. A stop such as a collar 50 is screwed to the cylinder 40 together with additional shims 52 and 54 so that the maximum travel of the cylinder 40 (and the high temperature steam generator 10) is stopped by face 56 of the piston rod assembly 58. Advantageously, the modified backside snubbers 28 function in combination with the original hot bumper stop 38 to safely limit the maximum thermal movement of the steam generator 10. Also, these modified assemblies do not need to be removed.

While a present preferred practice of the present invention has been shown and described, it is to be understood that the invention may be otherwise variously embodied within the scope of the following claims of invention.

We claim:

1. A method of laterally supporting a steam generator originally having hydraulic snubbers damping lateral thermal movement of the steam generator, comprising the steps of:

emptying hydraulic fluid from all hydraulic snubbers originally supporting a steam generator; and then laterally supporting the steam generator with at least some of the empty snubbers as the steam generator moves in the operation of a nuclear reactor vessel connected to the steam generator by a hot leg.

2. A method of laterally supporting a steam generator originally having hydraulic snubbers damping lateral thermal movement of the steam generator, comprising the steps of:

emptying hydraulic fluid from piston cylinders of all snubbers extending from a steam generator; and then placing stops around piston rods extending into the piston cylinders of empty snubbers extending from the back side of the steam generator to stop the thermal growth of the steam generator in the operation of the nuclear reactor vessel to generate power.

* * * * *